United States Patent [19]

Gigou

[11] 4,290,853

[45] Sep. 22, 1981

[54] PROTECTION OF STEAM PIPING IN A NUCLEAR REACTOR

[75] Inventor: Roger Gigou, Herblay, France

[73] Assignee: Framatome, Courbevoie, France

[21] Appl. No.: 952,588

[22] Filed: Oct. 16, 1978

[30] Foreign Application Priority Data

Oct. 21, 1977 [FR] France ............... 77 31705

[51] Int. Cl.³ .............................. G21C 5/12
[52] U.S. Cl. ....................... 176/87; 176/65; 137/360
[58] Field of Search ............ 176/65, 87; 165/54, 165/56, 57, 69, 71, 162; 137/360

[56] References Cited

U.S. PATENT DOCUMENTS

| | | | |
|---|---|---|---|
| 3,136,442 | 6/1964 | Massey | 137/360 X |
| 3,563,267 | 2/1971 | Thompson | 137/360 X |
| 3,907,636 | 9/1975 | Swart | 176/87 |
| 3,937,651 | 2/1976 | Schabert et al. | 176/87 X |
| 3,971,401 | 7/1976 | Persson | 137/360 |
| 3,977,940 | 8/1976 | Frisch et al. | 176/87 X |
| 4,077,837 | 3/1978 | Schabert et al. | 176/87 X |
| 4,137,967 | 2/1979 | Hirschle | 176/87 X |

Primary Examiner—Peter A. Nelson
Attorney, Agent, or Firm—Haseltine and Lake

[57] ABSTRACT

In the protection of a portion of steam piping, e.g., live-steam piping, as it exits from the confinement chamber of a nuclear reactor, the portion of steam piping exits from the chamber in the direction of a mean radial plane of the passage through the chamber wall and is then bent substantially through 90°. Upstream of the bend the piping includes a stopcock and between the stopcock and the bend the piping is held by guide elements between two sliding surfaces of guide means parallel to and symmetrical relative to the said radial plane, the guide means being supported on the confinement chamber wall, and by connecting rods symmetrical relative to the said radial plane and connected to the piping and the chamber wall.

2 Claims, 5 Drawing Figures

PROTECTION OF STEAM PIPING IN A NUCLEAR REACTOR

The present invention relates to the protection of the steam pipes at the outlet of a nuclear reactor and more particularly of a nuclear reactor using pressurized water.

In a reactor using pressurized water, at least one primary circuit of pressurized water circulates in a closed loop between the vessel of the reactor where the water absorbs the heat evolved by the fuel elements and a steam generator where it gives up this heat to a secondary water/steam circuit used in the turbo-alternator groups. The reactor, the steam generator or generators and the corresponding primary circuits are completely enclosed in the reactor housing which forms a leaktight confinement chamber. The secondary circuit crosses this chamber twice, once for the live-steam circuit, from the generator to the turbines, and once for the return water circuit from the condenser to the generator.

The live-steam circuit is equipped with an isolating stopcock placed in the piping outside the reactor housing, after it has passed through the confinement wall. The isolating stopcock is a safety element and, even in the case of accidental breaking of pipes downstream, it is important that the stresses and the resulting thermal shock are not likely to cause mechanical deformations around the stopcock, which may prevent it from functioning correctly.

Occasional attempts have been made to move the stopcock away from the chamber in order to give greater elasticity to the piping between the stopcock and the leaktight passage through the chamber wall which forms a fixed point; however, this involves extending the section which is called the "protected section", upstream from the stopcock, and which must comply with very strict stress standards. Furthermore, extension of this section makes it very difficult to protect it against direct vertical impact from falling objects, which protection is frequently called "bunkerization".

Finally, it is essential to protect the outlet of the piping and the stopcock against the risks of relative movement between housings in the event of an earthquake or subsidence of the ground.

According to the present invention there is provided an assembly for protecting a portion of steam piping in a nuclear reactor downstream of the leaktight passage of said piping through the confinement wall of said reactor, said piping comprising a first portion extending from said passage in a mean radial plane of said passage and connected by a bend to a second portion extending in a direction substantially perpendicular to said radial plane, and a stopcock connected in said first piping portion, said assembly comprising guide element means fixed to said first piping portion between said stopcock and said bend, providing surfaces in two planes parallel to said radial plane and symmetrical relative thereto, and slidable on two plane conjugate surfaces of guide means fixed to a support fixed to said confinement chamber wall, and connecting rod means arranged symmetrically relative to said radial plane, connected to said support and to said first piping portion between said bend and said stopcock.

The invention will be more clearly understood from the following description of an embodiment thereof, given by way of example only, with reference to the accompanying drawings.

Figure 1:
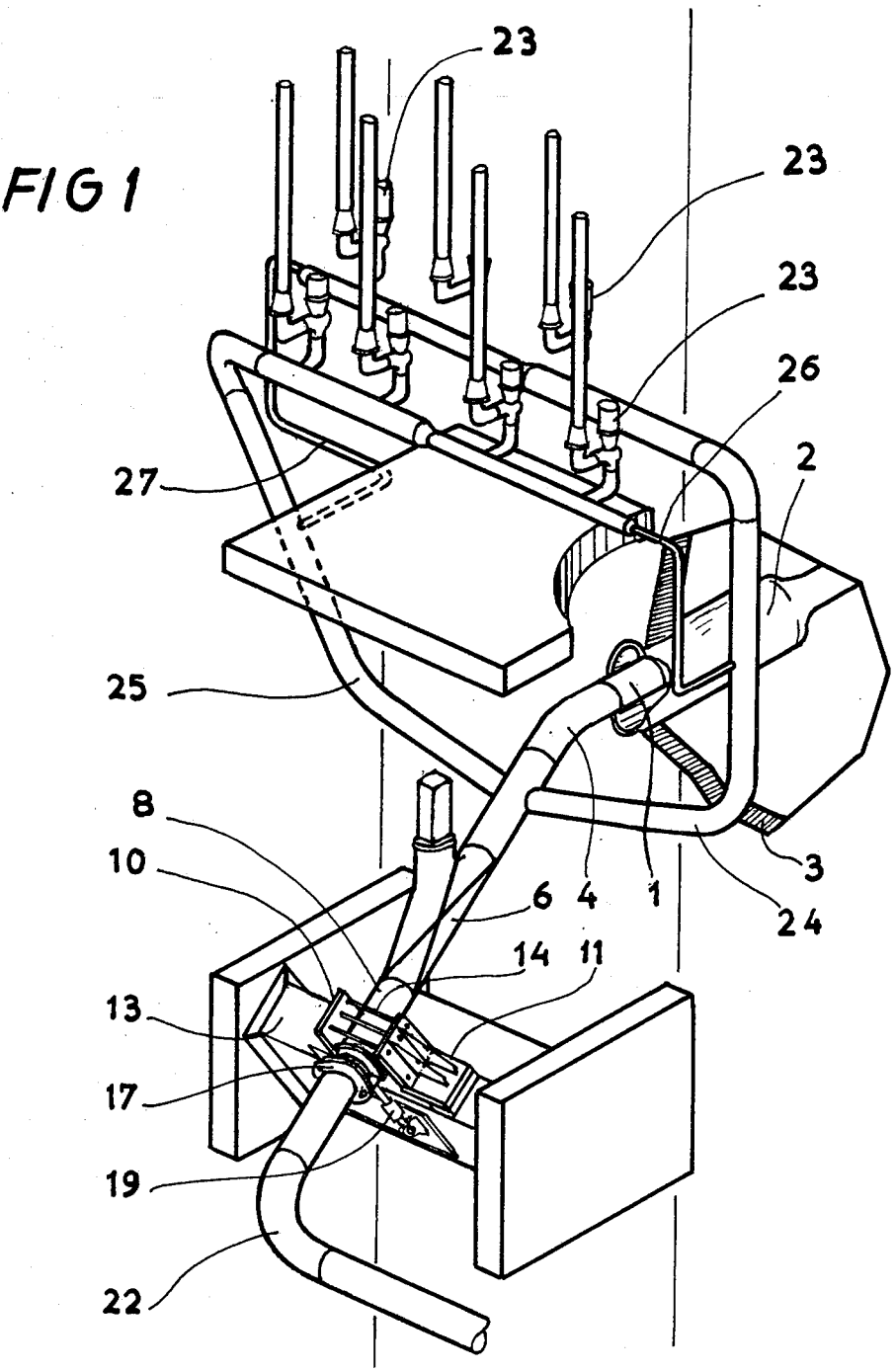
FIG. 1 is a simplified overall view, in perspective, showing the passage of live-steam piping, with its safety escape valves and a protective assembly according to the invention, through the confinement chamber wall.
Figure 2:
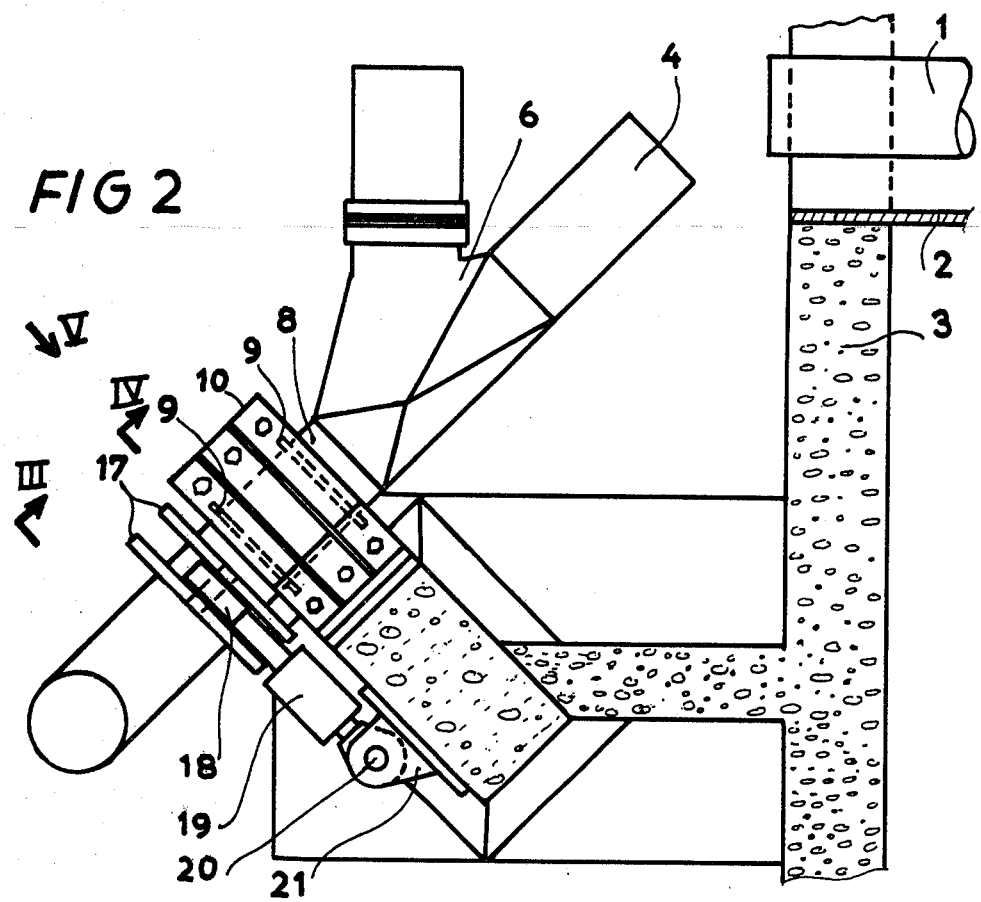
FIG. 2 is a side view, in partial section, on the line II—II of FIG. 5, which is parallel to the said radial plane of the passage, showing the piping, the stopcock and the protective assembly.
Figure 3:
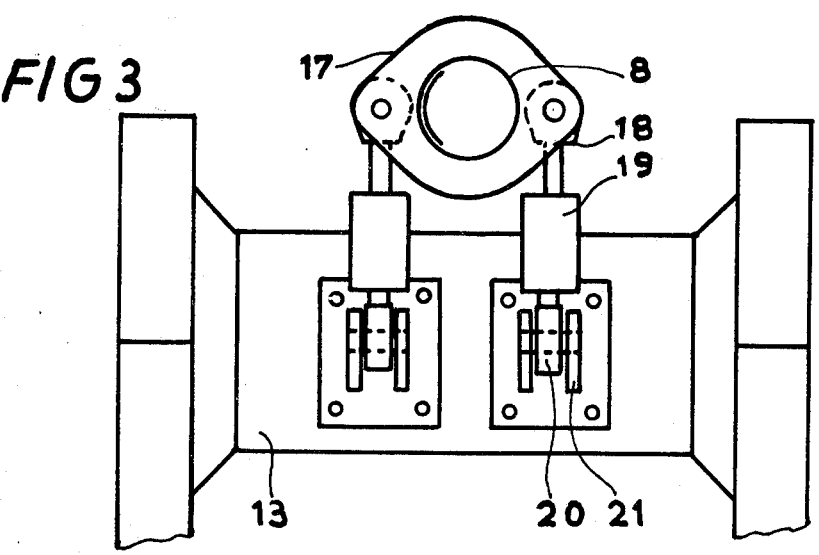
FIG. 3 is a view in the direction III of FIG. 2.
Figure 4:
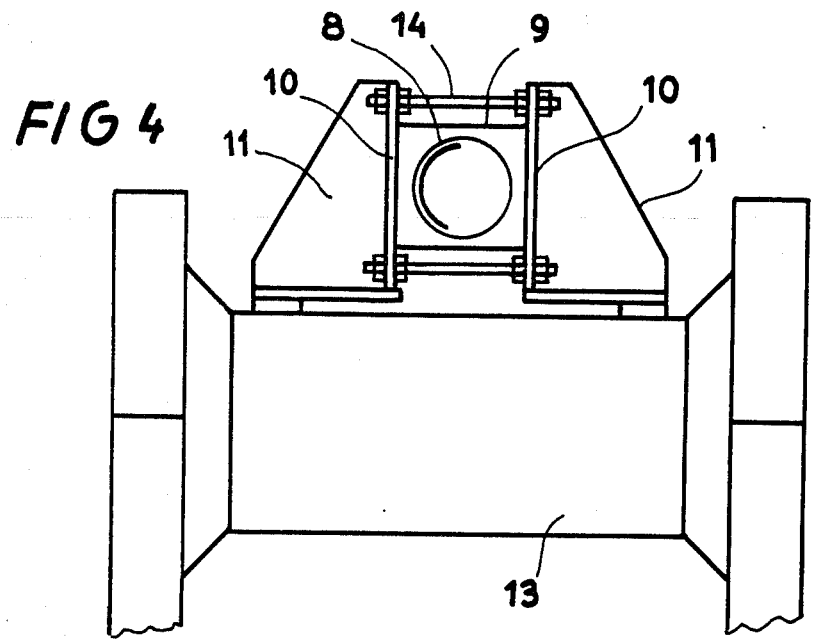
FIG. 4 is a view in the direction IV of FIG. 2.
Figure 5:
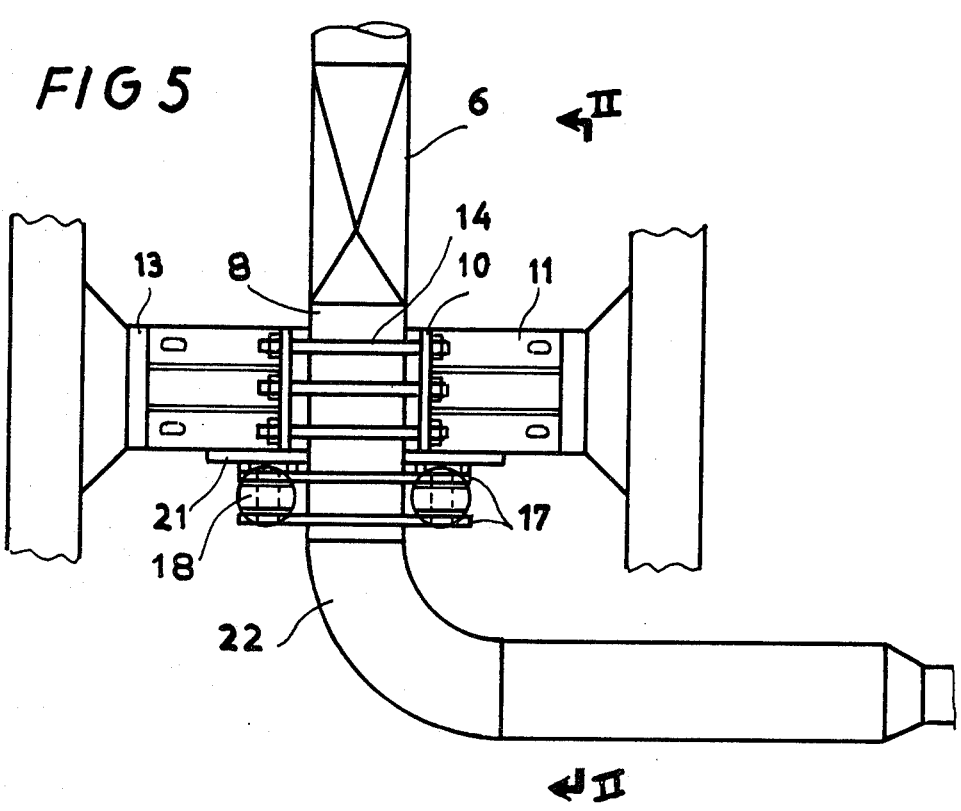
FIG. 5 is an oblique top view in the direction V of FIG. 2.

With reference to the drawings, it will be seen that the live-steam piping 1 leaves the reactor housing through a leaktight passage 2 through the confinement chamber wall 3. The piping is immediately bent downwards at 4, its axis remaining in a mean radial plane, i.e. a plane including the axis, of the passage, and terminates at the isolating stopcock 6.

Downstream from the stopcock, the piping 8 is welded to guide element means comprising two square plates 9, opposite edge faces of which lie in two planes which are parallel to the said radial plane of the passage and symmetrical relative thereto. These edge faces form sliding surfaces which are slidable on the conjugate surfaces of slide-guides 10 forming the vertical faces of two brackets 11. The brackets 11 are carried by the median section 13 of an I-shaped reinforced concrete beam joined to the confinement chamber by prestress, and are fixed to this beam by means of stays which are not shown in the drawings. The two guides 10 of the brackets 11 are joined to one another by means of high-strength stays 14, on either side of the piping 8. The clearance between the plates 9 and the slides 10, which is reserved for assembly, is determined so as to give a final clearance, at the normal operating temperature, which allows freedom of resilient movement.

Further downstream, the portion of piping 8 is also welded to two connecting straps or plates 17 which provide, on either side of the piping, two connecting-rod straps to which the heads 18 of two parallel shock-absorbing connecting rods are articulated. The other end of each connecting rod 19 is articulated at 20 on a support 21 fixed to the concrete beam 13.

The piping is then bent at 22 in a direction essentially perpendicular to the said radial plane, and, a little further on, the structure of the protected section becomes normal piping.

The effect of extending the protected section beyond the bend 22 is that it will only be possible for the piping to break in a zone which is sufficiently far from the bend for the stresses generated in the protecting device to be reduced virtually to bending or twisting stresses in a plane perpendicular to the said radial plane of the passage, or to bending stresses in this radial plane.

It is seen that all the stresses which tend to deform the piping in the zone of the stopcock 6, by means of twisting or bending in a plane perpendicular to the radial plane, will be absorbed by the bearing of the plates 9 on the slides 10 and, consequently, by the concrete structure integral with the confinement chamber wall. Furthermore, the stresses which tend to cause bending in the said radial plane will be absorbed by the connecting rods 19 and, consequently, also by the concrete structure. The connecting rods, together with their shock absorbers, can also absorb residual twisting stresses in the case where these stresses are not completely absorbed by the brackets 11.

Moreover, it will be noted that the arrangement described makes it possible to absorb all the stresses without it being necessary to move the stopcock away from the passage through the chamber wall. The zone in the protected section is therefore reduced to a minimum and, in particular, it only deviates very slightly from the said mean radial plane of the passage and occupies a very small angular space, which facilitates the bunkerization of this safety zone.

FIG. 1 also shows the circuit for balancing the escape valves, upstream of the stopcock 6. The escape valves 23 are distributed on two collectors 24 and 25 connected in parallel to the steam piping upstream of the stopcock. The valves on one collector are set to progressively increasing release pressures and, in order to equalize the flow through each valve, the cross-section of the collector is reduced downstream of each valve or group of valves. In order to keep all the zones of the collectors at equal pressure, the collectors are in the form of loops. In this case, the looping is achieved by joining, by means of a tube 26 of small cross-section, the end of the collector 25, downstream of its last valve, to the inlet of the other collector 24, upstream of its first valve, and conversely by means of the tube 27.

The valves thus distributed on two collectors have less overall bulk, which makes it possible to place them in the zone above the stopcock, and the assembly of low radial bulk can easily be protected by means of a casemate. Despite the distribution on two collectors, the crossed looping ensures complete equalizaiton of the pressures in all the zones of the two collectors.

It will also be noted that the assembly described above makes it possible to transfer the stresses developed in the pipes to the prestressed chamber wall of the reactor housing, and thus to avoid differential movement between housings in the event of an earthquake, the pipes and the steam stopcock being supported on the chamber wall of the reactor housing itself.

Of course, the invention is not intended to be strictly limited to the embodiment which has been described by way of example, but it also encompasses those embodiments which would only differ therefrom in detail, in different methods of carrying out the process or in the use of equivalent means. For example, it is possible to replace the shock-absorbing connecting rods 19 by ordinary connecting rods or even to replace the set of two connecting rods by a single connecting rod which would then be in the said radial plane of the passage; in fact, regardless of the system of connecting rods used, it suffices that the resultant of the reaction of the connecting rods on the piping should be located in the said radial plane of the passage. Moreover, the bend 4 in the example described is only imposed by the particular structure of the stopcock 6; with other types of stopcocks, the piping could remain straight, insofar as its axis remains in a mean radial plane of the passage up to a point beyond the brackets 11 and the connecting rods 19.

What is claimed is:

1. An assembly for protecting a portion of steam piping in a nuclear reactor downstream of the leaktight passage of said piping through the confinement chamber wall of said reactor, said piping comprising a first portion extending from said passage in a mean radial plane of said passage and connected by a bend to a second portion extending in a direction substantially perpendicular to said radial plane, and a stopcock connected in said first piping portion, said assembly comprising a support fixed to said confinement chamber wall; guide means fixed to said support and having a pair of plane guide surfaces extending parallel to said radial plane and symmetrical relative thereto; guide element means fixed to said first piping portion between said bend and said stopcock and slidable on said guide surfaces; connecting rod means including shock absorbing means connected to said support and arranged symmetrically relative to said radial plane, said shock absorbing means compensating for deleterious forces exerted on the stopcock and connecting means fixed to said first piping portion between said bend and said stopcock and connected to said connecting rod means.

2. An assembly according to claim 1, wherein said connecting rod means comprise a plurality of rods each provided with a shock absorbing device.

* * * * *